UNITED STATES PATENT OFFICE.

VICTOR MÜLLER, OF PHILADELPHIA, PENNSYLVANIA, ASSIGNOR TO MORAN, MÜLLER & MORRIS, OF PHILADELPHIA, PENNSYLVANIA, A COPARTNERSHIP CONSISTING OF JOHN H. MORAN, VICTOR MÜLLER, AND JAMES A. MORRIS.

COMPOSITION FOR TREATING STEEL.

1,372,364.  Specification of Letters Patent.  Patented Mar. 22, 1921.

No Drawing.  Application filed August 6, 1920. Serial No. 401,663.

*To all whom it may concern:*

Be it known that I, VICTOR MÜLLER, a renounced citizen of Germany, residing in the city of Philadelphia, in the county of Philadelphia and State of Pennsylvania, have invented a certain new and useful Composition for Treating Steel, of which the following is a full, clear, and exact description.

My invention relates primarily to the art of restoring steel, and particularly tool steel, when the quality of the metal has been impaired by overheating; but also relates in general to the treatment of steel.

My invention consists of a new composition of matter comprising bone dust, charcoal, resin, cyanid of potassium and borax, all in a finely divided state and intimately mixed with a suitable quantity of oil and animal fat to form a homogeneous pasty substance. For the oil ingredient I prefer to use cod-liver oil and for the fatty substance I employ tallow.

Experiment has shown that the best results are obtained with a mixture of the ingredients named in substantially the following proportions:

Bone dust, ten parts;
Charcoal, five parts;
Resin, two parts;
Cyanid of potassium, two parts;
Borax, two parts;
Cod liver oil, twenty parts;
Tallow, ten parts.

To make the composition, the pulverulent substances are ground or otherwise reduced to a finely divided state and brought together with the oil and suet in a steam jacketed kettle or the like. The mixture is slowly cooked and continually stirred until the ingredients are thoroughly mixed. The mass is then allowed to cool until it forms a paste, in which state it is in condition to be used.

In using the composition the procedure consists simply in heating the metal to be treated, then immersing it in the composition, reheating slightly if necessary, and finally plunging it in a cooling bath. The temperature to which the metal may be heated varies within rather wide limits, from red heat to white heat, because of the restorative properties of the composition, which nullify the damage usually caused by over heating. The time of immersion in the composition should vary according to the quantity of the metal treated. For small pieces a fraction of a minute is sufficient.

While, as previously stated, the principal use for the composition is in restoring or regenerating so-called "burnt steel," I have found it useful to treat all high carbon steels with the same composition prior to hardening. Steel so treated will be found to have superior qualities and to be very much less liable to damage from overheating. In other words, my composition will act both as a restorative and a protective agent.

Having thus described my invention what I claim is:

1. A composition of matter comprising, in substantially the proportions named, ten parts of bone dust, five parts of charcoal, two parts of resin, two parts of cyanid of potassium, two parts of borax, thirty parts of lubricant.

2. A composition of matter comprising, in substantially the proportions named, ten parts of bone dust, five parts of charcoal, two parts of resin, two parts of cyanid of potassium, two parts of borax, twenty parts of cod liver oil, ten parts of tallow.

VICTOR MÜLLER.